P. W. ZELLER.
SPRING SUPPORT FOR WAGON SHAFTS.
APPLICATION FILED APR. 18, 1910.
994,232.
Patented June 6, 1911.
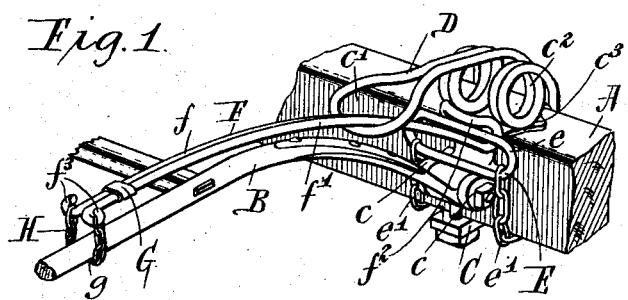
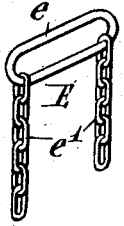
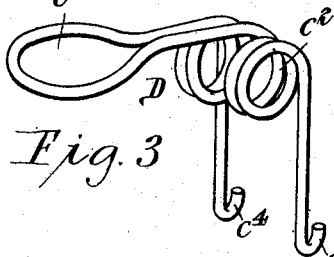
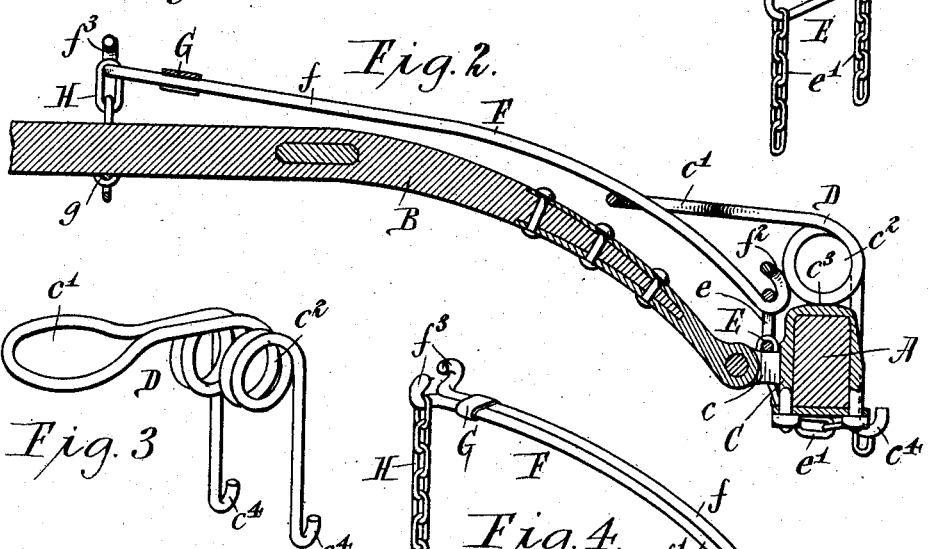
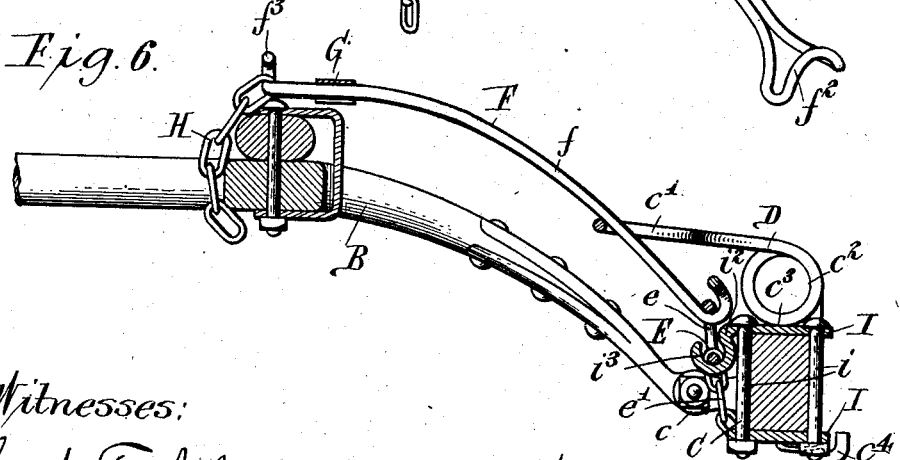
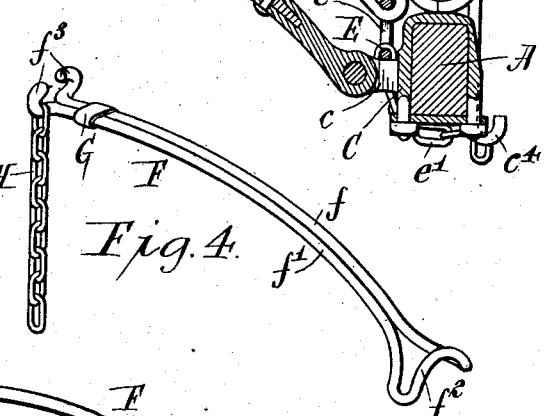
Witnesses:
Chrust Finle, Jr.,
Jacob L. Oberst, Jr.
Paul W. Zeller, Inventor.
By Emil Neuhart
Attorney.

UNITED STATES PATENT OFFICE.

PAUL W. ZELLER, OF BUFFALO, NEW YORK.

SPRING-SUPPORT FOR WAGON-SHAFTS.

994,232.

Specification of Letters Patent. Patented June 6, 1911.

Application filed April 18, 1910. Serial No. 555,988.

*To all whom it may concern:*

Be it known that I, PAUL W. ZELLER, a citizen of the United States, and resident of Buffalo, in the county of Erie and State of New York, have invented certain new and useful Improvements in Spring-Supports for Wagon-Shafts, of which the following is a specification.

My invention relates to spring supports for wagon shafts and it has for its primary object the production of a simple and inexpensive device of this character which can be attached to any ordinary vehicle without removing any of the parts ordinarily used on such vehicles, the support serving to relieve the horse of the weight of the shafts.

Another object of my invention is the production of a device of this character which may be attached without resorting to the skilled labor of a blacksmith.

With these and other objects in view, the invention consists in the details of construction, arrangements and combinations of parts to be hereinafter more fully set forth and claimed.

In describing the invention in detail, reference will be had to the accompanying drawings forming part of this specification, wherein like characters denote corresponding parts in the several figures, and in which,—

Figure 1 is a perspective view of a portion of a vehicle having my improved spring shaft-support attached thereto. Fig. 2 is a central longitudinal section of the support and adjacent parts of a vehicle. Fig. 3 is a detached perspective view of the spring supporting-member. Fig. 4 is a detached perspective view of the shaft sustaining-arm and the chain at the outer end thereof adapted to be passed around one of the poles of the shafts. Fig. 5 is a perspective view of the securing link and its attached chains. Fig. 6 is a central longitudinal section of a shaft support embodying my invention in modified form.

The reference letter A designates the front axle of a vehicle, B a shaft attached to a clip C of ordinary construction secured to the axle. Said clip has two forwardly-extending ears $c$, as is common, to which the rear end of the shaft is pivotally secured.

D represents a spring supporting-member having bearing on the axle and E represents a securing-device by means of which the spring supporting-member is held in place. Said spring supporting-member is preferably formed of a single piece of wire curved midlength into the form of a loop $c^1$, the two strands of wire thus formed being directed rearwardly in contact with each other and a short distance in rear of said loop having convolutions to form a coil $c^2$ which bears against the axle, as at $c^3$. From the outer ends of the coil, the strands of wire are directed downward in rear of the axle and preferably to a point slightly below the under side thereof, their extremities being curved upon themselves to form upwardly directed hooks $c^4$.

The securing-device E comprises an elongated link $e$ disposed transversely and seated against the forwardly-extending ears of the clip C, and secured to this link are two chains $e^1$ which are passed underneath the axle and are connected with the hooks $c^4$ of the spring supporting-member, the links of the chains $e^1$ assuring a solid seating of the link $e$ against said ears.

The sustaining-arm is designated by the letter F and is preferably formed of a single piece of wire bent upon itself midlength with the two strands of wire $f$, $f^1$ thus formed lying in contact with each other throughout the greater portion of their length. At their rear ends these strands are separated and bent forwardly to form a hook $f^2$ which is hooked onto the link $e$ of the securing device E. This sustaining-arm is passed through the loop $c^1$ of the spring supporting-member and extends forward in line with one of the poles of the shafts, the outer or free end thereof being curved outwardly, thence upwardly and inwardly to provide oppositely-directed hooks $f^3$. A clip G is passed around the two strands of wire to hold them securely together. A chain H is passed around the shaft, as at $g$, and is secured to the two hooks $f^3$ of the sustaining-arm and when securing the chain H to the sustaining-arm, said arm is drawn downward against the action of the spring supporting-member, and by the use of said chain, the tension can be regulated by drawing the arm as tight as desired and hooking the desired link of the chain onto one of the hooks at the outer end of the sustaining-arm.

In the drawing I have shown a single support attached to one side of the shafts, but if desired a second support may be used and attached to the outer side of the shafts.

In the modification shown in Fig. 6, I provide for attaching the outer end of the sustaining-arm to the center of the crossbar connecting the two poles of the shafts, but in such cases it is necessary to provide a clip on the axle at a point intermediate the clips now used for attaching the shafts to the axle. Said intermediate clip may be of any construction, but I preferably provide two bars I, one lying against the top and the other against the bottom of the axle, said bars being fastened to the axle by bolts $i$. The upper bar is preferably longer than the lower bar and has a forwardly-projecting portion $i^2$ which is fashioned into an upwardly-opening hook $i^3$ which receives the elongated link $e$ of the securing-device E and supports the same in a manner similar to the forwardly-projecting ears $c$ of the clip C hereinbefore described. In other respects the shaft-support is similar to and secured to the axle A in the same manner as the shaft-support shown in Figs. 1 to 5, but in this modification, the outer free end of the sustaining-arm is positioned directly over the center of the cross-bar connecting the two poles of the shafts. When the chain H is passed underneath said cross-bar and attached to the hooks at the outer end of the sustaining-arm it supports the shafts in exactly the same manner as the preferred construction hereinbefore described.

Having thus described my invention, what I claim is,—

1. A support for wagon shafts comprising a spring supporting-member having a forwardly extending portion provided with a loop, securing-means for fastening the rear end of said supporting-member to the axle of the wagon, a sustaining arm formed of wire passing through said loop and having a hook at its rear end engaging said securing means and hooks at its front end, and a flexible fastening device secured to said last-mentioned hooks and passed around a portion of the shaft.

2. A support for wagon shafts, comprising a spring supporting-member carried on the axle of the wagon, means for fastening the rear end of said supporting-member to the axle including an elongated link, and a sustaining-arm receiving support at a point between its ends from said supporting-member and having a hook at its rear end engaging said elongated link, and means at the front end of said sustaining-arm for connecting the same to the shafts.

3. The combination with an axle having a clip provided with a pair of forwardly-directed ears and shafts pivotally secured between said ears, of a spring supporting-member resting on said clip and having a forwardly-directed portion provided with a loop and a downwardly-directed portion terminating in hooks, an elongated link carried by said pair of ears, a chain connecting said link with the hooks of said supporting-member, a sustaining-arm fulcrumed on said elongated link and extending forward through the loop of said supporting-member, and means for connecting the front end of said sustaining-arm with a portion of the shafts.

4. The combination with an axle having a clip thereon and shafts secured to said clip, of a spring supporting-member resting on said axle, means for holding said supporting-member against the axle including a sustaining-arm yieldingly supported by said supporting-member and pivotally secured at its rear end, and means for connecting the front end of said sustaining-arm with the shafts.

5. The combination with the axle having a clip secured thereto, of a spring supporting-member comprising a spring coil resting on said clip, a forwardly-extending portion having a loop and a downwardly-extending portion terminating in upturned hooks, an elongated link resting on said clip beneath said forwardly-extending portion of the supporting-member, two chains secured to said link and passing downward and underneath the axle for connection with said upturned hooks, a sustaining-arm formed of a single piece of wire bent between its ends to provide two strands lying in contact throughout the greater portion of their length and bent laterally at their front ends and recurved to form oppositely-directed hooks, the rear end of said arm being curved upon itself to form a hook connected with said elongated link, said sustaining-arm passing through the loop of said supporting-member, and a chain connected to the hooks at the front end of said sustaining-arm and passed around a portion of the shafts.

In testimony whereof, I have affixed my signature in the presence of two subscribing witnesses.

PAUL W. ZELLER.

Witnesses:
ELLA C. PLUECKHAHN,
EMIL NEUHART.